United States Patent Office 3,388,165
Patented June 11, 1968

3,388,165
PRODUCTS OF THE REACTION OF CHLORAL WITH HYDROHALIDES WITH ALKANOL-AMINES AND DIALKANOLAMINES
Andrew C. Hazy, New Haven, and Joseph V. Karabinos, Orange, Conn., assignors, by mesne assignments, to E. R. Squibb & Sons, Inc., New York, N.Y., a corporation of Delaware
No Drawing. Filed Oct. 15, 1965, Ser. No. 496,650
5 Claims. (Cl. 260—584)

ABSTRACT OF THE DISCLOSURE

Hydrohalides of compounds of the formula

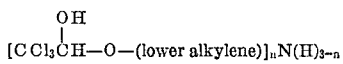

wherein $n$ is one or two, are prepared by reacting chloral with a hydrohalide of an alkanolamine or di-alkanolamine. The compounds are useful as hypnotic agents.

This invention relates to new chemical compounds, compositions including the same, and their methods of preparation and use.

Prior to this invention, it was known that chloral was a potent hypnotic. Unfortunately, however, chloral is a hygroscopic liquid that is difficult to formulate in suitable pharmaceutical compositions.

It has now been found that if chloral is reacted with a mono- or di(lower alkanol)amine hydrohalide, new compounds are prepared that are relatively stable solids and hence more readily formulated for pharmaceutical use. These new compounds are superior to prior known reaction products of chloral, such as the product obtained by interacting chloral with choline, in that the amount of chloral present in the resulting compound is greater than that previously obtainable. Moreover, upon in vivo hydrolysis, the amines that are regenerated in the compounds of this invention are pharmaceutically acceptable in that they are non-toxic at the concentration in which they are present.

The new compounds of this invention are the hydrohalides of compounds of the formula

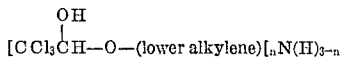

wherein $n$ is one or two. The preferred compounds of this invention are those wherein the lower alkylene contains two to three carbon atoms (i.e., ethylene, isopropylene and propylene), and the hydrohalide is hydrochloride.

To prepare the new compounds of this invention, chloral is reacted with a hydrohalide of the desired amine. The choice of salt is critical, for if other salts, such as the nitrate or fumarate are used, the chloral is polymerized and if the free base is used, the chloral either decomposes to chloroform or reacts on the nitrogen atom. Suitable amines include the hydrohalide salts (e.g., the hydrochloride) of: ethanolamine, diethanolamine, propanolamine, isopropanolamine, dipropanolamine and diisopropanolamine.

The new compounds of this invention are useful as hypnotic agents, for which purpose they are preferably administered perorally at such dose as to provide, upon hydrolysis, about 100 mg. to 2 g. (and optimally about 250 mg. to 1 g.) of chloral. For such use, the compounds of this invention are preferably formulated in solid dosage unit forms, such as tablets and capsules, in the usual manner.

The following examples illustrate the invention (all temperatures being in centigrade):

Example 1.—α-(2-aminoethoxy)-β,β,β-trichloroethanol hydrochloride

A mixture of 0.05 mole of ethanolamine hydrochloride and 0.15 mole of anhydrous chloral is stirred vigorously while being heated to 100°. The mixture becomes visibly more viscous and solidifies after 30 minutes. The resulting white solid is washed with three 50-ml. portions of anhydrous ether and oven dried at 60° for 1 hour to give a 97% yield of α-(2-aminoethoxy)-β,β,β-trichloroethanol hydrochloride, M.P. about 114–115°.

*Analysis.*—Calc'd for $C_4H_9Cl_4NO_2$: C, 19.61; H, 3.70; Cl, 57.9; N, 5.72. Found: C, 19.66; H, 3.71; Cl, 57.2; N, 5.69.

Example 2.—1,1'-[iminobis(ethyleneoxy)]bis(2,2,2,-trichloroethanol) hydrochloride A suspension of 0.18 mole of diethanolamine hydrochloride in 0.45 mole of anhydrous chloral is stirred vigorously while a temperature of 95° is maintained for 3½ hours until a clear solution is obtained. The solution is allowed to cool to room temperature and the resulting "wax" is triturated with three 50-ml. portions of anhydrous ether until a finely divided white solid is obtained. This is recovered by filtration (suction) and washed with four 100-ml. portions of anhydrous ether. The solid is then air dried overnight to give an 87% yield of 1,1'-[iminobis(ethyleneoxy)]bis(2,2,2 - trichloroethanol) hydrochloride, M.P. about 110–111° (dec.).

*Analysis.*—Calc'd for $C_8H_{14}Cl_7NO_4$: C, 22.02; H, 3.23; N, 3.21. Found: C, 22.01; H, 3.20; N, 3.53.

Example 3.—α-(2-aminopropoxy)-β,β,β-trichloroethanol hydrochloride

Following the procedure of Example 1 but substituting an equivalent amount of 2-aminopropanol-1 hydrochloride for the ethanolamine hydrochloride, α-(2-aminopropoxy)-β,β,β-trichloroethanol hydrochloride is obtained.

Example 4.—α-(3-aminopropoxy)-β,β,β-trichloroethanol hydrobromide

Following the procedure of Example 1 but substituting an equivalent amount of 3-aminopropanol-1 hydrobromide for the ethanolamine hydrochloride, α-(3-aminopropoxy-β,β,β-trichloroethanol hydrobromide is obtained.

Example 5.—1,1'-[iminobis(trimethyleneoxy)]bis(2,2,2-trichloroethanol) hydrochloride Following the procedure of Example 2 but substituting an equivalent amount of di(3-hydroxypropyl)amine hydrochloride for the diethanolamine hydrochloride, 1,1'-[iminobis(trimethyleneoxy)]bis(2,2,2 - trichloroethanol) hydrochloride is obtained.

Example 6

To prepare 100 two-piece gelatin capsules each containing 200 mg. of α-(2-aminoethoxy)-β,β,β-trichloroethanol hydrochloride, 20 grams of α-(2-aminoethoxy)-β,β,β-trichloroethanol hydrochloride is thoroughly intermixed with 15 grams of lactose and 300 mg. of magnesium stearate and 353 mg. of the resulting mixture is placed in each capsule.

Example 7

To prepare 100 tablets each containing 600 mg. of α-(2-aminoethoxy)-β,β,β-trichloroethanol hydrochloride, 60 grams of α-(2-aminoethoxy)-β,β,β-trichloroethanol hydrochloride, 3 grams of polyvinylpyrrolidone and 400 ml. of alcohol are thoroughly intermixed, dried and pulverized. To this dried powder is added 3 grams of starch and 1 gram of magnesium stearate and the solids thoroughly intermixed. Six hundred and seventy milligram portions of the resulting mixture are compressed to give tablets.

In a similar manner, all other compounds of this invention can be encapsulated and tableted.

The invention may be variously otherwise embodied within the scope of the appended claims.

What is claimed is:

1. A hydrobromide or hydrochloride of a compound of the formula

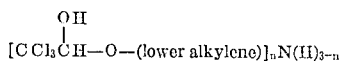

wherein $n$ is a positive integer less than three.

2. α-(2-aminoethoxy)-β,β,β-trichloroethanol hydrohalide, wherein the hydrohalide is hydrobromide or hydrochloride.

3. α-(2 - aminoethoxy)-β,β,β-trichloroethanol hydrochloride.

4. 1,1' - [iminobis(ethyleneoxy)]bis(2,2,2 - trichloroethanol) hydrohalide, wherein the hydrohalide is hydrobromide or hydrochloride.

5. 1,1' - [iminobis(ethyleneoxy)]bis(2,2,2 - trichloroethanol) hydrochloride.

References Cited

UNITED STATES PATENTS 635,471  10/1899  Fuchs _____ 260—615

CHARLES B. PARKER, *Primary Examiner.*

R. L. RAYMOND, *Assistant Examiner.*